(12) United States Patent
Wong et al.

(10) Patent No.: US 6,216,152 B1
(45) Date of Patent: Apr. 10, 2001

(54) METHOD AND APPARATUS FOR PROVIDING PLUG IN MEDIA DECODERS

(75) Inventors: Daniel C. W. Wong, San Jose; Jesus David Rivas, San Francisco; Amith Yamasani, Mountain View, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/958,622

(22) Filed: Oct. 27, 1997

(51) Int. Cl.[7] .................................................. G06F 13/00
(52) U.S. Cl. ............................ 709/203; 707/10; 707/103
(58) Field of Search ................................. 707/10, 103, 3, 707/4, 5, 6, 104; 380/25; 395/680, 681, 682, 200.48, 200.49; 709/203, 202, 231, 246, 247

(56) References Cited

U.S. PATENT DOCUMENTS

| | | | |
|---|---|---|---|
| 5,630,066 | * | 5/1997 | Gosling ................................. 709/221 |
| 5,692,183 | * | 11/1997 | Hapner et al. ........................ 395/614 |
| 5,758,153 | * | 5/1998 | Atsatt et al. ......................... 395/614 |
| 5,787,019 | * | 7/1998 | Knight et al. ........................ 364/550 |
| 5,793,954 | * | 8/1998 | Baker et al. ....................... 395/200.8 |
| 5,794,232 | * | 8/1998 | Mahlum et al. .......................... 707/3 |
| 5,809,145 | * | 9/1998 | Silk et al. ............................... 380/25 |
| 5,809,250 | * | 9/1998 | Kisor ............................... 395/200.57 |
| 5,809,507 | * | 9/1998 | Cavannaugh, III .................. 707/103 |
| 5,815,661 | * | 9/1998 | Gosling ........................... 395/200.46 |
| 5,842,014 | * | 11/1998 | Brooks et al. ........................ 395/673 |
| 5,881,230 | * | 3/1999 | Christensen et al. ................ 709/203 |
| 5,903,728 | * | 5/1999 | Semenzato .......................... 395/712 |
| 5,913,033 | * | 6/1999 | Grout ................................... 709/219 |
| 5,928,323 | * | 7/1999 | Gosling et al. ...................... 709/203 |

OTHER PUBLICATIONS

Mark R. Brown, "WWW Plug–Ins Companion," Netscapeworld Book Excerpt, Oct. 1996, 1–31.*

(List continued on next page.)

Primary Examiner—Paul V. Kulik
(74) Attorney, Agent, or Firm—The Hecker Law Group (57) ABSTRACT

A method and apparatus for providing plug-in media decoders. Embodiments provide a "plug-in" decoder architecture that allows software decoders to be transparently downloaded, along with media data. User applications are able to support new media types as long as the corresponding plug-in decoder is available with the media data. Persistent storage requirements are decreased because the downloaded decoder is transient, existing in application memory for the duration of execution of the user application. The architecture also supports use of plug-in decoders already installed in the user computer. One embodiment is implemented with object-based class files executed in a virtual machine to form a media application. A media data type is determined from incoming media data, and used to generate a class name for a corresponding codec (coder-decoder) object. A class path vector is searched, including the source location of the incoming media data, to determine the location of the codec class file for the given class name. When the desired codec class file is located, the virtual machine's class loader loads the class file for integration into the media application. If the codec class file is located across the network at the source location of the media data, the class loader downloads the codec class file from the network. Once the class file is loaded into the virtual machine, an instance of the codec class is created within the media application to decode/decompress the media data as appropriate for the media data type.

27 Claims, 5 Drawing Sheets

OTHER PUBLICATIONS

Business Wire, Aug. 6, 1997, "GEO Publishing 2–Internet Multimedia "Unplugged": GEO Publishing Unveils Emblaze Creator 2.5; Company Upgrades the First Multimedia Authoring Tool That Does Not Reguire Browser Plug–Ins or Server Applications," 2 pages.*

Anonymous "Adobe Acrobat Resources: Forms Plug–in Update" www.adobe.com, 1998.*

Anonymous "Web Browser Plug–ins" www.scout.cs.wisc.edu, 1998.*

Keizer "Pluggin' Away at Plug–ins" www.complife.com, 1997.*

Crowe "Netscape Plug–ins: Are they Worth the Download" www.currents.net, Oct. 1996.*

Gosling, J. et al: "The Java Language Environment. A White Paper" Oct. 1995. Sun Delivers Java Workshop, pp. 1, 4–85 XP002042922.

B. Day: "Java Media Framework Player API" Javaworld Online!, Apr. 1997 XP002093309.

C. McManis: The basics of Java Class loaders: Javaworld Online!, Oct. 1996 XP002093310.

* cited by examiner

METHOD AND APPARATUS FOR PROVIDING PLUG IN MEDIA DECODERS

BACKGROUND OF THE INVENTION

1. Field of the Invention

This invention relates to the field of object-oriented computer applications, and, more specifically, to network media applications.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Growing interest in the media distribution capabilities of the Internet and the World Wide Web has resulted in the development of a variety of multimedia data compression and encoding formats or media types, such as MPEG-1, MPEG-2, QuickTime, H.261, PCM, AU and MIDI, for efficient transport of audio, video and other forms of media. Media applications supporting one or more such media types are available for presenting multimedia content downloaded from the Internet or other networks. To enhance the capabilities of those media applications, plug-in decoders are often installed on the user machine to facilitate decompression/decoding of particular media types.

Unfortunately, the installation of plug-in decoders becomes cumbersome in terms of storage resources required for installing the plug-ins on the user computer system. Also, a user is required to locate the often elusive plug-in decoders, and install them on the user computer system prior to viewing any media data of a given format. The utility of a media application is thus limited to those media formats supported by a user's collection of installed plug-in decoders. With the large numbers of current media types, and the constant influx of new media types, it is not feasible to install every type of plug-in decoder. To better illustrate the shortcomings of current media applications, description of a sample networked multimedia environment of the prior art is given below with respect to FIG. 1.

Figure 1:
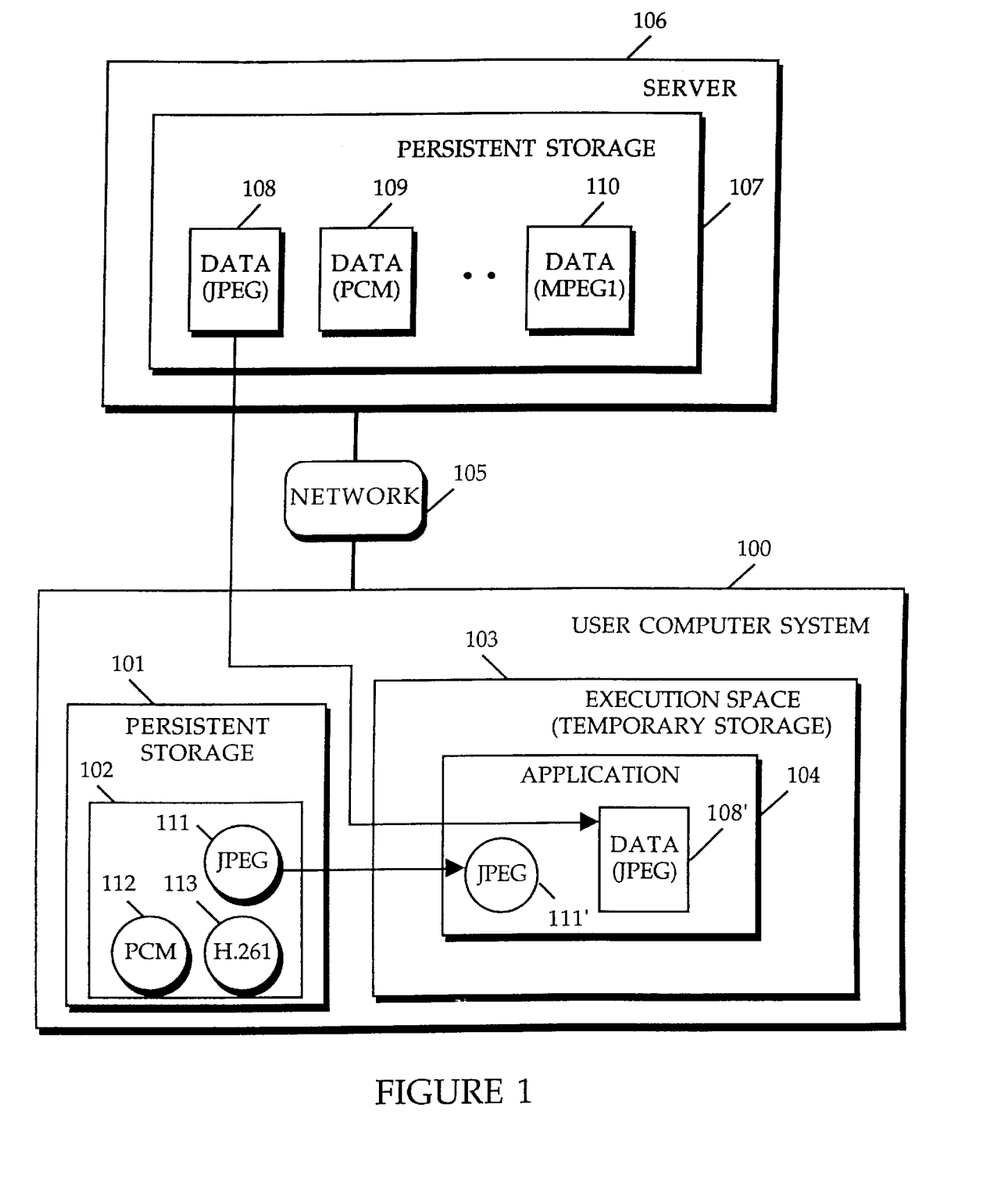
FIG. 1 is a block diagram of a networked multimedia system of the prior art.

In FIG. 1, user computer system 100 is coupled to server 106 via network 105. Server 106 comprises persistent storage 107, which contains a library of media data of various data types (e.g., JPEG, PCM, MPEG1, Cinepak, etc.). The media data include data files 108, 109 and 110 of data types JPEG, PCM and MPEG1, respectively.

User computer system 100 comprises a persistent storage resource 101, such as a hard drive, and an execution space 103 in temporary storage such as system RAM. Persistent storage 101 contains a plug-in library 102 comprising installed plug-in decoders 111, 112 and 113 corresponding to JPEG, PCM and H.261 data types, respectively. Execution space 103 contains media application 104, which comprises JPEG data file 108' and plug-in JPEG decoder 111' for decoding/decompressing JPEG media data.

JPEG data file 108' is a copy of data file 108, downloaded from server 106. Plug-in decoder 111' is a copy of JPEG decoder 111 loaded from persistent storage 101 to accommodate processing of JPEG data. Because user computer system 100 only has plug-in decoders for JPEG, PCM and H.261 data types installed in persistent storage 101, media application 104 is limited to presenting either JPEG, PCM or H.261 media data. For example, MPEG1 data file 110 from server 106 cannot be presented by media application 104 because there is no plug-in decoder installed in persistent storage 101 for decoding/decompressing MPEG1 media data. There is no mechanism for decoding media data of data types for which a corresponding plug-in is not installed on the user computer system. Further, unused plug-in decoders installed on user computer system 100 represent an inefficient use of storage resources.

For systems such as diskless clients and Network Computers (NCs), which are not equipped with persistent storage such as a hard disk, pre-installation of media decoders is not supported. A plug-in architecture may not be possible, limiting presentation of media to a small number of data types supported by decoders built into the media application itself. No flexibility is provided for new data types.

SUMMARY OF THE INVENTION

A method and apparatus for providing plug-in media decoders is described. Embodiments of the invention provide a "plug-in" decoder architecture that allows software decoders to be transparently downloaded, along with media data, from a network to a user application on a user computer. The user application is thus able to support new media types as long as the corresponding plug-in decoder is available over the network with the media data. Persistent storage requirements are lessened because the downloaded decoder is transient, existing in application memory for the duration of execution of the user application. The architecture also supports use of plug-in decoders already installed in the user computer.

One embodiment of the invention is implemented with object-based class files executed in a virtual machine to form a media application. A media data type is determined from incoming media data, and used to generate a class name for a codec (coder-decoder) object corresponding to the given media data type. A search is performed of all locations provided in a class path vector, including the source location of the incoming media data, to determine the location of the codec class file for the given class name. When the desired codec class file is located, the virtual machine's class loader loads the class file for integration into the media application. If the codec class file is located across the network at the source location of the media data, the class loader downloads the codec class file from the network. Once the class file is loaded into the virtual machine, an instance of the codec class is created within the media application to decode/decompress the media data as appropriate for the media data type.

DETAILED DESCRIPTION OF THE INVENTION

The invention is a method and apparatus for providing plug-in media decoders. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

A "plug-in" decoder architecture is provided which allows software decoders to be downloaded from a network, along with media data, and integrated into a media application for use in processing the media data. The media application is thus able to support new media types as long as the corresponding plug-in decoder is available over the network with the media data. The downloading process and the integration of the decoder into the user application is transparent to the user. Further, the downloaded decoder is transient, existing in application memory for the duration of execution of the user application. Therefore, persistent storage resources, such as space on a hard drive, are not required for permanently installing plug-in decoders. Diskless clients and Network Computers (NCs) are therefore able to take advantage of the flexibility provided by the plug-in decoder architecture.

The plug-in decoder architecture also supports plug-in decoders that are not downloaded, but are locally installed (stored in persistent storage) on the user computer system. The installed plug-in decoder can thus be used, when present, to minimize download time.

Figure 2:
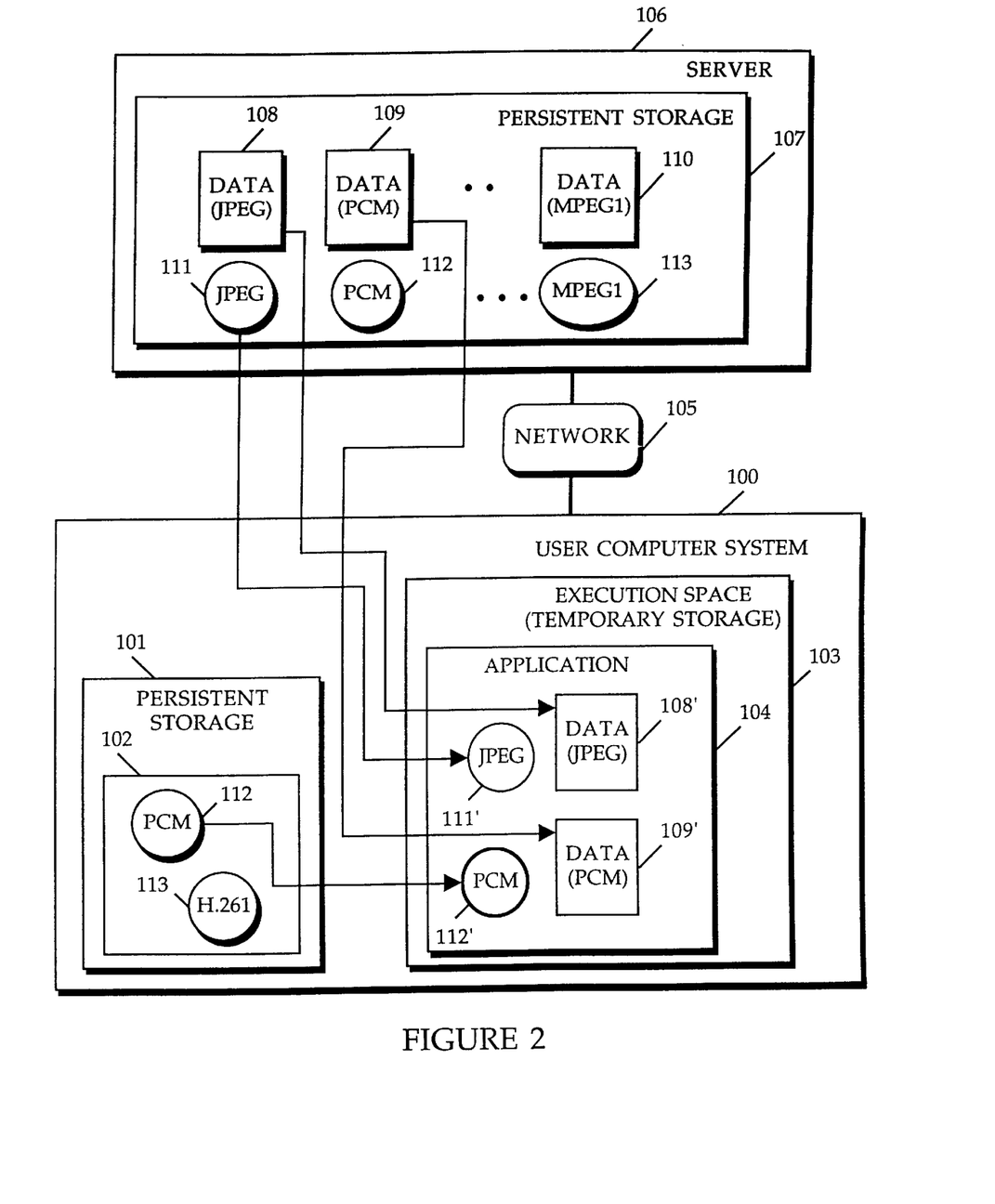
FIG. 2 is a block diagram of a networked multimedia system in accordance with an embodiment of the invention.

FIG. 2 is a block diagram of a network environment illustrating the provision of plug-in decoders with media data in accordance with an embodiment of the invention. A server is provided that contains media data of various data types, as well as corresponding decoders for use in decoding/decompressing each type of media data provided. A user computer system contains a media application for presenting media data. A limited number of plug-in decoders are provided in the user computer system.

In FIG. 2, user computer system 100 is coupled to server 106 via network 105. Server 106 comprises persistent storage 107, which contains a library of media data of various types (e.g., JPEG, PCM, H.261, MPEG1, MPEG2, Cinepak, MIDI, etc.). The media data include data files 108, 109 and 110 of data types JPEG, PCM and H.261, respectively. Corresponding plug-in decoders for each data type are also stored within persistent storage 107, including decoders 111, 112 and 114, for decoding/decompressing JPEG, PCM and H.261 media data, respectively.

User computer system 100 comprises a persistent storage 101, such as a hard drive, and an execution space 103 in temporary storage such as system RAM. Persistent storage 101 contains a plug-in library 102 comprising installed plug-in decoders 112 and 113 corresponding to data types PCM and MPEG1, respectively. Execution space 103 contains media application 104, which comprises JPEG data file 108' and PCM data file 109'. Application 104 also comprises plug-in decoders 111' and 112' for decoding/decompressing JPEG and PCM media data, respectively.

Data files 108' and 109' are transient copies of data files 108 and 109 downloaded from server 106. Similarly, plug-in JPEG decoder 111' is a transient copy of plug-in JPEG decoder 111 downloaded from server 106 to accommodate processing of JPEG media data. Plug-in PCM decoder 112' is a copy of plug-in PCM decoder 112 loaded from persistent storage 101. Alternatively, because plug-in decoder 112 for media data of type PCM is both installed on user computer system 100 and on server 106, plug-in PCM decoder 112' may be downloaded from server 106. When application 104 shuts down, plug-in decoders 111' and 112' are deleted from execution space 103.

Because user computer system 100 only has plug-in decoders for data types PCM and MPEG1 installed in persistent storage 101, under prior art systems, media application 104 would be limited to presenting media of data types PCM or MPEG1. However, because plug-in decoders are provided from the server for each type of data available from the server in the form of data files, and because a mechanism is provided for downloading the plug-in decoders from the server, the presentation of media data of any of those types (JPEG, PCM, H.261, etc.) is supported by the system of FIG. 2.

An embodiment of the invention utilizes object classes to implement lug-in decoders in an object-oriented environment. For a better understanding of object classes, a brief description of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–23.

A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary"

instance variables and the "set_salary" method. The values associated with the "name" and "salary" variables in each employee object instance contain the name and salary of an employee in the organization. A message can be sent to an employee's employee object instance to invoke the "set_ salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects.

Development of software applications may be performed in an independent piecewise manner by establishing application programming interfaces (APIs) for components of the application. An API refers to the methods of a particular component that are accessible by other components, and the format by which those methods may be invoked. The particular implementation of those methods is important only with respect to the design of the particular component. Each component is designed individually to implement its respective API and any internal functions, and to interface with the APIs of the other components of the application. Typically, these components comprise one or more objects forming the application.

Examples of object-oriented programming languages include C++ and Java®. Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

An embodiment of the invention is implemented in the Java programming language as a media application constructed using the Java Media Framework (JMF). The media application and the Java Media Framework are more fully described below.

Example Multimedia Embodiment of the Invention

Figure 3:
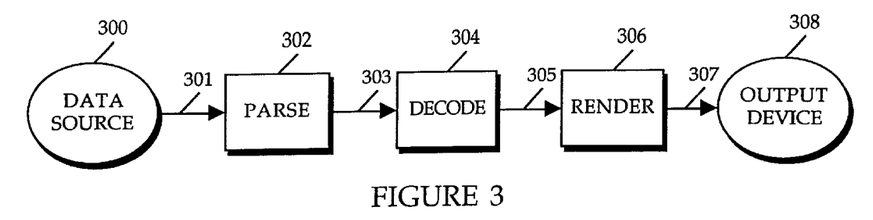
FIG. 3 is a block diagram of a media processing pipeline in a media application.

The Java Media Framework (JMF) is a set of multimedia APIs and implementations designed to playback multimedia in a variety of protocols and formats, such as a QuickTime Cinepak movie over the HTTP (Hypertext Transfer Protocol) protocol. The Java Media Framework specifies the concept of a "player," a unit to playback multimedia data. As illustrated in FIG. 3, within each JMF player are implementations of the three main stages of the media processing pipeline: the parser 302, the decoder 304 and the renderer 306. Parser 302 transforms the media data from protocol-specific network packet data 301 received from a network source 300 into a compressed and/or encoded media data file or stream 303. Decoder (codec) 304 transforms the compressed and/or encoded media data 303 into raw (decompressed and unencoded) media data 305 for use by renderer 306. Renderer 306 processes the raw media data 305 into media output 307 for display or presentation on an output device 308, such as a monitor for graphics or a speaker for audio.

A decoder (codec) is a Java object responsible for decoding a single compression format. An example is a JPEG decoder which decodes JPEG compressed video frames. A particular implementation of a JMF player may include several of these decoder objects for use in viewing multimedia data.

A mechanism is provided to plug in new decoders to extend the Java Media Framework. This mechanism includes a well-defined Java codec object interface, and a search mechanism to load and instantiate the codec. An example of a well-defined codec object interface is provided as Appendix A in the form of several related APIs.

In an embodiment of the invention, the search mechanism maps well-known codec names to Java class names, and makes use of the Java class loader for the installation of the codec into the JMF player. The use of the Java class loader provides a flexible approach to install codec classes. Codec classes can be searched and installed from a variety of sources as specified in the Java classpath, a vector of pathnames to class packages. This mechanism allows for integration of codec classes that are downloaded from the network, as well as codec classes that are locally and permanently installed on the user computer system. Downloaded codecs have the property of being transient in nature. This means that the downloaded codec classes are downloaded "on the fly" and exist on the user computer system only for the duration of execution of the player.

The player can be in one of six states: unrealized, realizing, realized, prefetching, prefetched and started. In normal operation, a player steps through each state until it reaches the "started" state. When a player is first created, it is in the "unrealized" state. The player has been instantiated, but does not yet know anything about its media.

When the realize( ) method is called, a player moves from the "unrealized" state into the "realizing" state. A realizing player is in the process of determining its resource requirements. During realization, a player acquires the resources the player only needs to acquire once. These might include parsing, decoding and rendering resources other than exclusive-use resources (exclusive-use resources are limited resources such as particular hardware devices that can only be used by one player at a time; such resources are acquired during "prefetching").

When a player finishes "realizing," the player moves into the "realized" state. A realized player knows what resources it needs and information about the type of media it is to present. A realized player knows how to render its data, and can therefore provide visual components and controls. The player's connections to other objects in the system are in place, but the player does not own any resources that would prevent another player from starting.

When the prefetch( ) method is called, a player moves from the "realized" state into the "prefetching" state. A prefetching player is preparing to present its media. During this state, the player preloads its media data, obtains exclusive-use resources, and anything else the player needs to do to prepare itself to play. It is typically during this state that the plug-in codec is acquired in accordance with an embodiment of the invention.

When a player finishes "prefetching," the player moves into the "prefetched" state. A player in the "prefetched" state is ready to be started, and waits for invocation of the start( ) method to transition into the "started" state. During the "started" state, a player's time-base time and media time are mapped, and the media data is presented.

In accordance with a preferred embodiment of the invention, during the "prefetching" state described above, the player obtains a plug-in codec object for decoding/decompressing the incoming media data. Alternatively, the plug-in codec object may be obtained during the "realizing" state. An embodiment of a method by which plug-in decoders are located and integrated into a media application is illustrated in the flow diagram of FIG. 4.

Figure 4:
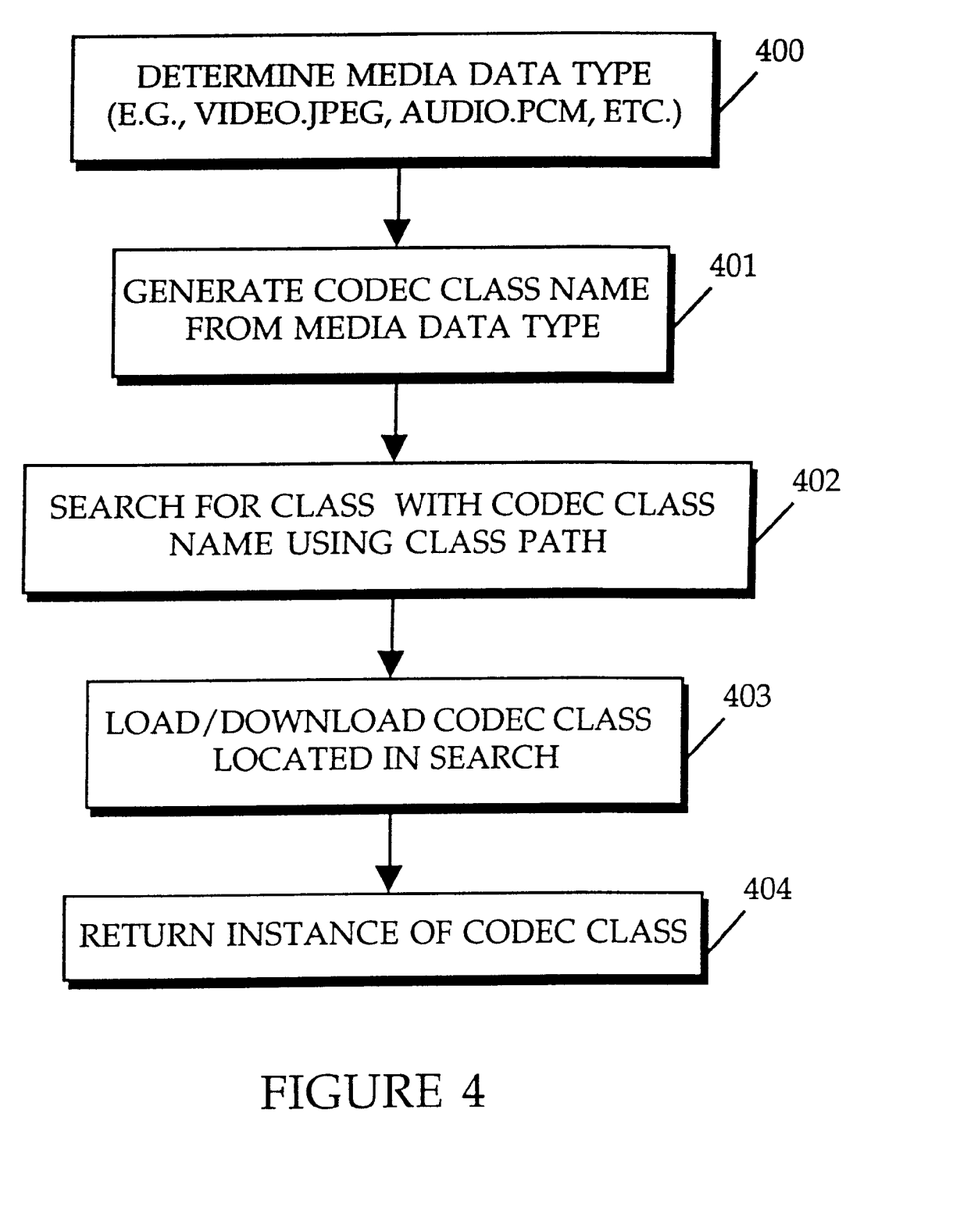
FIG. 4 is a flow diagram of a method for providing a plug-in media decoder in accordance with an embodiment of the invention.

In step 400, the data type of the media data is determined, for example, from the data header information extracted by the parser. From the data type information, in step 401, the codec class name can be generated. This is more efficiently handled if standardized naming conventions are used. For example, from a data type of "video/cinepak," a suitable codec class name might be "media.codec.video.cinepak.Codec." Similarly, a media data file of type "audio/pcm" might be decoded/decompressed by an instance of the codec class "media.codec.audio.pcm.Codec."

In step 402, the class name is used to perform a search for the corresponding class using a class path vector as the basis for the search. The class path vector typically contains one or more path names for repositories of hierarchically distributed class files, including the currently active path to the source of the media data. A sample class path might be:

ClassPath=.:/java/lib:/users/jsmith/classes

In order to search for class "media.codec.audio.pcm.Codec" in path "/java/lib", the directory "/java/lib/media/codec/audio/pcm" would be searched for the presence of a "Codec.class" file. Each pathname is searched in order until the class is found. Thus, a search of the pathname of the media server providing the media data will result in the successful location of a desired codec class on the server.

In step 403, depending on whether the codec class was found on the user computer system or on the server, the codec class is either loaded from persistent storage on the user computer system or downloaded from the server. The Java class loader handles the loading/downloading of the codec class byte-code file and integration of the codec class into the Java virtual machine. In step 404, an instance of the codec class is returned to the player for use in processing the media data.

In an embodiment of the invention, the above method is incorporated into a codec factory object to facilitate the creation of plug-in codec object instances for a media application such as the JMF player. An embodiment of a codec factory implementation is graphically represented in the block diagram of FIG. 5.

Figure 5:
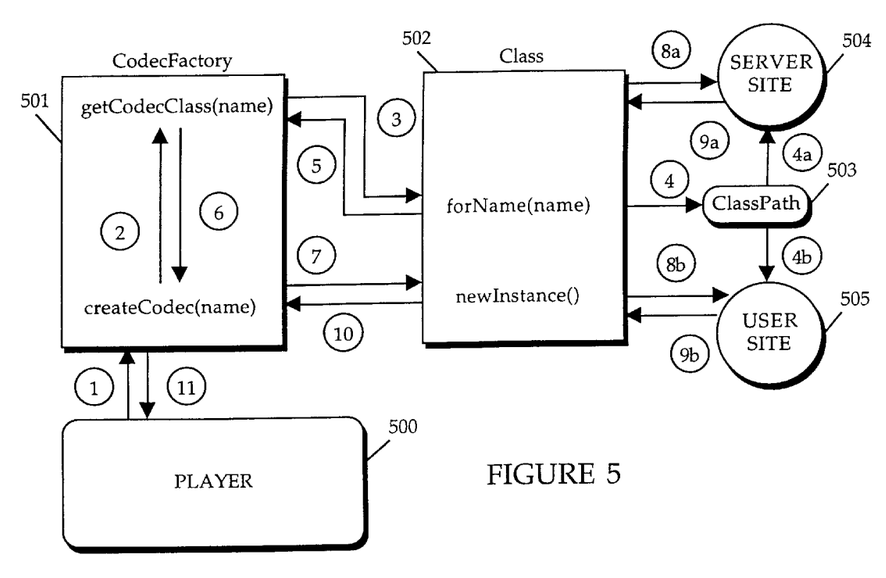
FIG. 5 is a block diagram of software object apparatus for creating a codec instance in accordance with an embodiment of the invention.

The embodiment of FIG. 5 comprises player 500 referencing CodecFactory instance 501, which, in turn, references Class instance 502. CodecFactory instance 501 contains methods getCodecClass( ) and createCodec( ). Class instance 502 contains methods forName( ) and newinstance( ). The forName( ) method uses the classpath 503 to search for a class of a specified class name, and returns the runtime Class descriptor for the class with the specified name. The newInstance( ) method returns a newly allocated instance of the class represented by the Class object. The class loader is invoked by newInstance( ) to load/download the given class if it is not already present in the virtual machine.

After determining the data type of incoming media data, in step 1, player 500 invokes the createCodec( ) method of CodecFactory 501, specifying the codec name based on the data type. In step 2, createCodec( ) invokes the getCodecClass( ) method, passing the codec name from step 1. The getCodecClass( ) method qualifies the codec name with appropriate package prefixes and suffixes as needed, and in step 3, invokes the forName( ) method of Class instance 502 using the qualified class name.

In step 4, the forName( ) method uses the ClassPath vector 503 to search server site 504 and user site 505 (represented by arrows 4*a* and 4*b*, respectively) to locate the specified codec class. In step 5, the forName( ) method of Class instance 502 returns the Class descriptor for the codec class to the getCodecClass( ) method of CodecFactory instance 501. In step 6, the Class descriptor is returned to the createCodec( ) method.

In step 7, the createCodec( ) method invokes the newinstance( ) method on the Class descriptor to create an instance of the represented codec class. In step 8*a* (or 8*b*), the newInstance( ) method uses the class loader to access server site 504 (or user site 505) to facilitate downloading (or loading) of the codec class into the virtual machine in step 9*a* (or 9*b*). In step 10, the newInstance( ) method returns the codec class instance to the createCodec( ) method of CodecFactory instance 501, which then returns the codec class instance to player 500 in step 11.

Embodiment of Computer Execution Environment (Hardware)

Figure 6:
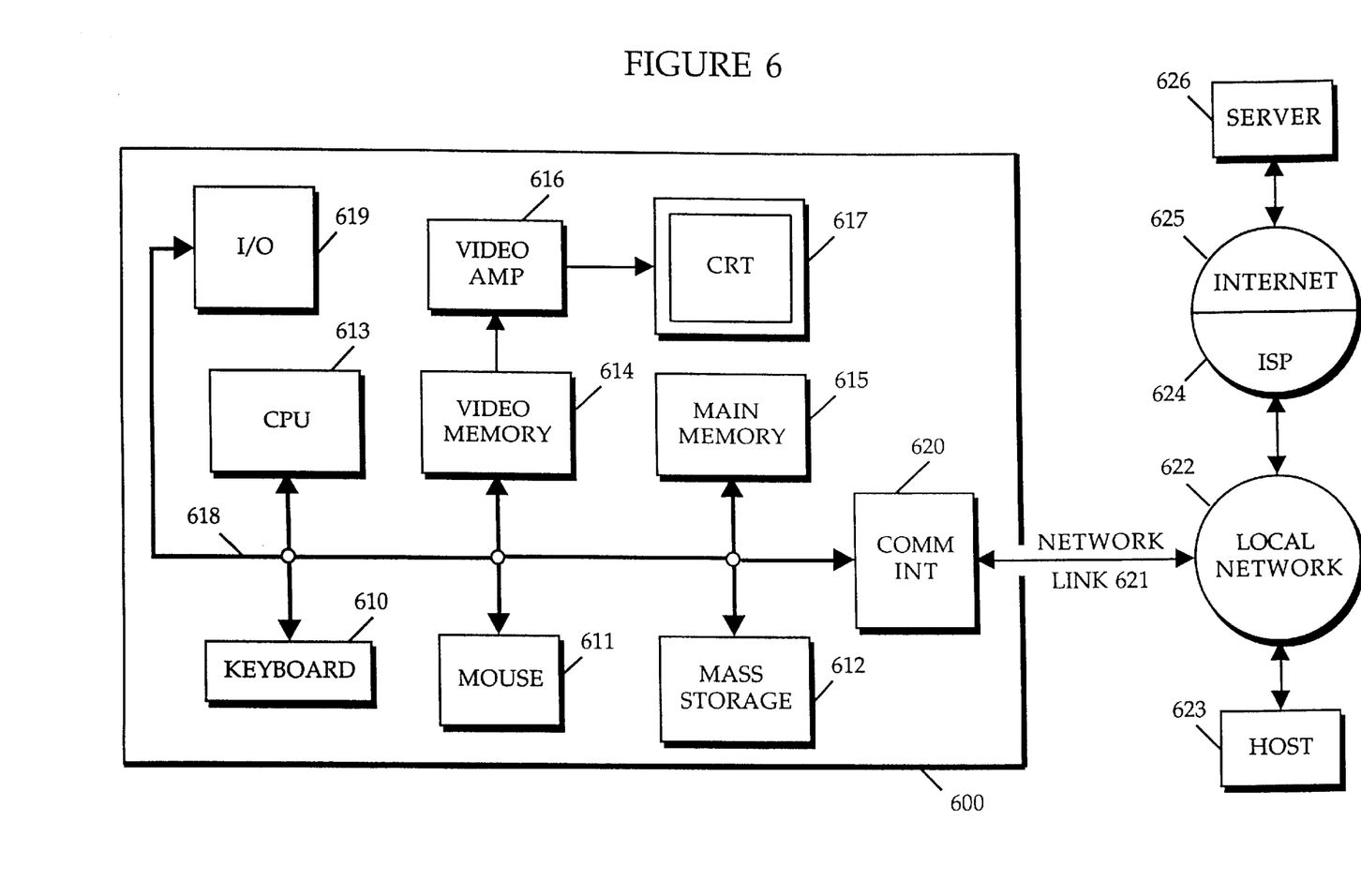
FIG. 6 is a block diagram of an embodiment of a computer system capable of providing a suitable execution environment for an embodiment of the invention.

An embodiment of the invention can be implemented as computer software in the form of computer readable program code executed on a general purpose computer such as computer 600 illustrated in FIG. 6, or in the form of byte-code class files executable by a virtual machine running on such a computer. A keyboard 610 and mouse 611 are coupled to a bi-directional system bus 618. The keyboard and mouse are for introducing user input to the computer system and communicating that user input to central processing unit (CPU) 613. Other suitable input devices may be used in addition to, or in place of, the mouse 611 and keyboard 610. I/O (input/output) unit 619 coupled to bi-directional system bus 618 represents such I/O elements as a printer, A/V (audio/video) I/O, etc.

Computer 600 includes a video memory 614, main memory 615 and mass storage 612, all coupled to bi-directional system bus 618 along with keyboard 610, mouse 611 and CPU 613. The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 32-bit data bus for transferring data between and among the components, such as CPU 613, main memory 615, video memory 614 and mass storage 612. Alternatively, multiplex data/address lines may be used instead of separate data and address lines.

In one embodiment of the invention, the CPU 613 is a microprocessor manufactured by Motorola®, such as the 680×0 processor or a microprocessor manufactured by Intel®, such as the 80×86, or Pentium® processor, or a SPARC® microprocessor from Sun Microsystems®. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 600 may also include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to host computer 623 or to data equipment operated by an Internet Service Provider (ISP) 624. ISP 624 in turn provides data communication services through the world wide packet data communication network now commonly referred to as the "Internet" 625. Local network 622 and Internet 625 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Computer 600 can send messages and receive data, including program code, through the network(s), network link 621, and communication interface 620. In the Internet example, server 626 might transmit a requested code for an application program through Internet 625, ISP 624, local network 622 and communication interface 620. In accord with the invention, one such downloaded application is the apparatus for providing software plug-in components described herein.

The received code may be executed by CPU 613 as it is received, and/or stored in mass storage 612, or other non-volatile storage for later execution. In this manner, computer 600 may obtain application code in the form of a carrier wave.

The computer systems described above are for purposes of example only. An embodiment of the invention may be implemented in any type of computer system or programming or processing environment.

Thus, a method and apparatus for providing plug-in media decoders has been described in conjunction with one or more specific embodiments. The invention is defined by the claims and their full scope of equivalents.

---

SECTION A

Class Hierarchy
class java.lang.Object
    interface com.sun.media.Codec
    interface com.sun.media.CodecOutput
    class com.sun.media.Data
    interface com.sun.media.Format
    class com.sun.media.MediaCodec (implements com.sun.media.Codec)
        class com.sun.media.MediaFrameCodec
    class com.sun.media.MediaFormat (implements com.sun.media.Format)

Interface com.sun.media.Codec
public interface Codec
The Codec interface declares a set of methods that any codec will need to implement in order to convert encoded/compressed audio or video data to a format that can be understood by a rendering node or device.

[Method Index]
- checkFormat(Data)
  This method is invoked by the framework before decode() is called to verify that the input data matches the current expected input format.
- decode(Data)
  This method does the actual data conversion.
- getInputFormat()
  Returns the format of the input data that the codec is expecting.
- getMaxScale()
  Returns the maximum scaling factor the codec can support.
- getMinScale()
  Returns the minimum scaling factor the codec can support.
- getOutputFormat()
  Returns the format of the output produced by the codec after a call to decode(. . .).
- getScale()
  Returns the current scaling factor.
- initialize(CodecOutput)
  Initialize the codec.
- setScale(float)
  Set the current scaling factor.

[Methods]
- initialize
public abstract boolean initialize(CodecOutput output)
    Initialize the codec. "Connect" the codec to its output.
    Parameters:
        output — output of the codec.
    Returns:
        true if it's successful.
- decode
public abstract boolean decode(Data inData)
    This method does the actual data conversion. If the conversion failed for any reason, it returns false.
    Parameters:
        inData — input data.
    Returns:
        true if decoding is successful.
- checkFormat
public abstract boolean checkFormat(Data inData)
    This method is invoked by the framework before decode() is called to verify that the input data matches the current expected input format. For codecs that can deal with changing formats, this is the place the codec is allowed to have a glimpse of the inpt data and change the decoding format before actually decoding the data in decode().
    Parameters:
        inData — the input data.
    Returns:
        true if the given data is of the expected input format; false if the given data does not have the right input format.
- getInputFormat
public abstract Format getInputFormat()
    Returns the format of the input data that the codec is expecting.
    See Also:
        decode
- getOutputFormat
public abstract Format getOutputFormat()
    Returns the format of the output produced by the codec after a call to decode(. . .).
    See Also:
        decode
- getMinScale
public abstract float getMinScale()
    Returns the minimum scaling factor the codec can support.
    Returns:
        the (linear) scaling factor.
- getMaxScale
public abstract float getMaxScale()
    Returns the maximum scaling factor the codec can support.
    Returns:
        the (linear) scaling factor.
- getScale
public abstract float getScale()
    Returns the current scaling factor.
    Returns:
        the (linear) scaling factor.
- setScale -continued public abstract float setScale(float scale)
    Set the current scaling factor.
    Returns:
        the (lineas) scaling factor set.

---

Interface com.sun.media.CodecOutput
public interface CodecOutput
An abstraction of the output interface from a codec.

[Method Index]
- decodeFailureUpdate(Data)
  Gets called when the decoding of a "frame" fails.
- decodeUpdate(Data)
  Gets called when a "frame" is done decoded.
- getOutputBuffer(Format)
  Gets an output buffer to hold the decoded bits.
- tryGetOutputBuffer(Format)
  A non-blocking version of getOutputBuffer.

[Methods]
- getOutputBuffer
public abstract Data getOutputBuffer(Format fmt)
  Gets an output buffer to hold the decoded bits. It blocks until the
  requested output buffer is available.
  Parameters:
    fmt — specifies the format of the buffer requested.
  Returns:
    the buffer.
- tryGetOutputBuffer
public abstract Data tryGetOutputBuffer(Format fmt)
  A non-blocking version of getOutputBuffer.
  Parameters:
    fmt — specifies the format of the buffer requested.
  Returns:
    the buffer.
- decodeUpdate
public abstract void decodeUpdate(Data decoded)
  Gets called when a "frame" is done decoded.
  Parameters:
    decoded — the decoded "frame".
- decodeFailureUpdate
public abstract void decodeFailureUpdate(Data decoded)
  Gets called when the decoding of a "frame" fails.
  Parameters:
    decoded — the buffer to be returned back to the pool of buffers.

---

Class com.sun.media.Data
java.lang.Object
   |
    +----com.sun.media.Data public abstract class Data
extends Object
Base class for audio/video data.

[Variable Index]
- duration
- EOM
  getLength() == EOM signifies the last chunk of data from the media.
- presentationTime

[Constructor Index]
- Data()

[Method Index]
- getBuffer()
  Retrieve the internal buffer.
- getBufferSize()
- getDiscard()
  Indicate whether this data should be discarded or not.
- getDuration()
- getFormat()
- getLength()

-continued

- getPresentationTime()
- setDiscard(boolean)
  Set whether this data should be discarded or not.
- setDuration(long)
  Set the duration of the data.
- setFormat(Format)
  set data format.
- setLength(int)
  Mark the length of data stored in the byte array.
- setPresentationTime(long)
  Set the presentation time of this particular segment of media data.

[Variables]
- presentationTime
protected long presentationTime
- duration
protected long duration
- EOM
public static final int EOM
  getLength() == EOM signifies the last chunk of data from the media.

[Constructors]
- Data
public Data()

[Methods]
- getFormat
public abstract Format getFormat()
  Returns:
    the data format.
- setFormat
public abstract boolean setFormat(Format f)
  set data format.
- getBuffer
public abstract Object getBuffer()
  Retrieve the internal buffer. An Object is returned. I could be of
  byte[] or int[]. "instanceof" can be used to find out.
  Returns:
    the buffer object.
- getBufferSize
public abstract int getBufferSize()
  Returns:
    the size of the buffer.
- getLength
public abstract int getLength()
  Returns:
    the length of data stored in the byte array. EOM if it's the last
    chunk of data from the media.
- setLength
public abstract void setLength(int 1)
  Mark the length of data stored in the byte array.
  Parameters:
    l — length of the data.
- getPresentationTime
public long getPresentationTime()
  Returns:
    the presentation time of this particular segment of media data.
- setPresentationTime
public void setPresentationTime(long t)
  Set the presentation time of this particular segment of media data.
  Parameters:
    t — the presentation time.
- getDuration
public long getDuration()
  Returns:
    the duration of this data.
- setDuration
public void setDuration(long duration)
  Set the duration of the data.
  Parameters:
    duration — the media duration.
- setDiscard
public void setDiscard(boolean f)
  Set whether this data should be discarded or not.
- getDiscard
public boolean getDiscard()
  Indicate whether this data should be discarded or not.

Interface com.sun.media.Format
public abstract interface Format
Operations to allow format negotiation. It is common to describe media data as a collection of attributes that can take values from a prescribed set. For example audio data often has a sample rate expressed as a floating point number. It is also common to describe media devices and media processing as capable of operating with media data over a broad range of possible values for particular attributes. Thus an audio renderer may be capable of accepting audio data with any sample rate between the ranges of 8000 and 48000. The format interface provides methods to facilitate the negotiation between objects that describe media data.

[Method Index]
- match(Format)
    Return a Format compatible with the argument.

[Methods]
- match
public abstract Format match(Format other)
    Return a Format compatible with the argument. If this format cannot find a format compatible object null is returned.
    Note: match is not commutative.
    Parameters:
        other — The format to attempt to match to.

Class com.sun.media.MediaCodec
java.lang.Object
     |
     +----com.sun.media.MediaCodec public abstract class MediaCodec
extends Object
implements Codec
This is an implementation base class of the Codec interface to convert encoded/compressed audio or video data to a format that can be understood by a rendering node or device.

[Constructor Index]
- MediaCodec()
- MediaCodec(CodecOutput)

[Method Index]
- checkFormat(Data)
    This method is invoked by the framework before decode() is called to verify that the input data matches the current expected input format.
- decode(Data)
    Decode the incoming bits.
- decodeFailureUpdate(Data)
    Call this when the decoding of a "frame" fails.
- decodeUpdate(Data)
    Call this when a "frame" is done decoding to put the decoded "frame" to the rendering node.
- getInputFormat()
    Returns the format of the input data that the codec is expecting.
- getMaxScale()
    Returns the maximum scaling factor the codec can support.
- getMinScale()
    Returns the minimum scaling factor the codec can support.
- getOutputBuffer(Format)
    Get an output buffer from the downstream node.
- getOutputFormat()
    Returns the format of the output produced by the codec after a call to decode(. . .).
- getScale()
    Returns the current scaling factor.
- initialize(CodecOutput)
- setScale(float)
    Set the current scaling factor.
- tryGetOutputBuffer(Format)
    A non-blocking version of getOutputBuffer.

[Constructors]
- MediaCodec
public MediaCodec()
- MediaCodec
public MediaCodec(CodecOutput o)

[Methods]
- initialize
public boolean initialize(CodecOutput n)
- decode
public abstract boolean decode(Data inData)
    Decode the incoming bits. Call notifyFrame() when a "frame" is completely decoded.
    Parameters:
        inData — input compressed data.
    Returns:
        whether the decoding is successful or not.
- checkFormat
public boolean checkFormat(Data inData)
    This method is invoked by the framework before decode() is called to verify that the input data matches the current expected input format. For codecs that can deal with changing formats, this is the place the codec is allowed to have a glimpse of the inpt data and change the decoding format before actually decoding the data in decode(in, out).
    Parameters:
        inData — the input data.
    Returns:
        true if the given data is of the expected input format.
- getInputFormat
public abstract Format getInputFormat()
    Returns the format of the input data that the codec is expecting.
    See Also:
        decode
- getOutputFormat
public abstract Format getOutputFormat()
    Returns the format of the output produced by the codec after a call to decode(. . .).
    See Also:
        decode
- getMinScale
public float getMinScale()
    Returns the minimum scaling factor the codec can support.
    Returns:
        the (linear) scaling factor.
- getMaxScale
public float getMaxScale()
    Returns the maximum scaling factor the codec can support.
    Returns:
        the (linear) scaling factor.
- getScale
public float getScale()
    Returns the current scaling factor.
    Returns:
        the (linear) scaling factor.
- setScale
public float setScale(float scale)
    Set the current scaling factor.
    Returns:
        the (lineas) scaling factor set.
- getOutputBuffer
protected Data getOutputBuffer(Format fmt)
    Get an output buffer from the downstream node. This is a utility method for use by subclasses of MediaCodec for the actual codec implementation.
    Parameters:
        fmt — specifies the format of the buffer requested.
    Returns:
        the buffer.
- tryGetOutputBuffer
protected Data tryGetOutputBuffer(Format fmt)
    A non-blocking version of getOutputBuffer. This is a utility method for use by subclasses of MediaCodec for the actual codec implementation.
    Parameters:
        fmt — specifies the format of the buffer requested.
    Returns:
        the buffer.
- decodeUpdate
protected void decodeUpdate(Data decoded)
    Call this when a "frame" is done decoding to put the decoded "frame" to the rendering node. This is a utility method for use by subclasses of MediaCodec for the actual codec implementation.
    Parameters:
        decoded — the decoded "frame".
- decodeFailureUpdate
protected void decodeFailureUpdate(Data decoded)
    Call this when the decoding of a "frame" fails. This is a utility method for use by subclasses of MediaCodec for the actual codec implementation.

```
    Parameters:
        decoded — the buffer to be returned back to the renderer.

Class com.sun.media.MediaFrameCodec
java.lang.Object
   |
   +----com.sun.media.MediaCodec
        |
        +----com.sun.media.MediaFrameCodec public abstract class MediaFrameCodec
extends MediaCodec
An implementation class to decode a "frame" of compressed data to a
"frame" of decompressed data. A "frame" doesn't have to refer to a
"video frame." It's just a logical unit of data.

[Constructor Index]
 •  MediaFrameCodec()
 •  MediaFrameCodec(CodecOutput)
[Method Index]
 •  allowDropFrame(boolean)
      Switch on or off the mechanism to drop frame.
 •  decode(Data)
      Gets called by the framework with a chunk of compressed data.
 •  decode(Data, Data)
      Implement this to do the real decoding work.
[Constructors]
 •  MediaFrameCodec
public MediaFrameCodec()
 •  MediaFrameCodec
public MediaFrameCodec(CodecOutput o)
[Methods]
 •  decode
public abstract boolean decode(Data in, Data out)
      Implement this to do the real decoding work.
      Parameters:
          in — input compressed data.
          out — output compressed data.
      Returns:
          true if the decoding is successful.
 •  allowDropFrame
public void allowDropFrame(boolean on)
      Switch on or off the mechanism to drop frame. If drop frame is on,
      the system will decide to drop frame if the frame is already too late
      to be presented. In such case, the frame will not reach the decode()
      function. Whether to take advantage of this is up to the codec writer.
      The advantage is that for compute intensive codecs, a delayed frame
      will not need to be processed if it will not be presented anyway. That
      saves quite some CPU cycles. This will not work for codec's that
      couldn't handle drop frames well.
      Parameters:
          on — turn on/off the frame dropping code.
 •  decode
public boolean decode(Data inData)
      Gets called by the framework with a chunk of compressed data.
      Parameters:
          inData — input compressed data.
      Returns:
          true if the decoding is successful.
      Overrides:
          decode in class MediaCodec Class com.sun.media.MediaFormat
java.lang.Object
   |
   +----com.sun.media.MediaFormat public abstract class MediaFormat
extends Object
implements Format
```

```
[Constructor Index]
 •  MediaFormat()
[Method Index]
 •  clone()
 •  getCodec()
 •  getDuration()
 •  match(Format)
 •  normalizeCodecName(String)
[Constructors]
 •  MediaFormat
public MediaFormat()
[Methods]
 •  match
public Format match(Format other)
 •  clone
public abstract Object clone()
      Overrides:
          clone in class Object
 •  getDuration
public abstract long getDuration()
 •  getCodec
public abstract String getCodec()
 •  normalizeCodecName
public static String normalizeCodecName(String codec)
```

What is claimed is:

1. A method of providing a plug-in decoder comprising:

initiating a data acquisition request for data, said data acquisition request initiated by an application;

downloading said data from a source location on a network, said data to be processed by said application;

determining a data type of said data by extracting header information from said data;

determining a plug-in component associated with said data type;

searching for said plug-in component;

obtaining said plug-in component; and loading said plug-in component into transient memory for use by said application for a transient duration.

2. The method of claim 1, wherein said step of determining said plug-in component comprises the step of determining a decoder class name from said data type.

3. The method of claim 1, wherein said step of searching for said plug-in component comprises the steps of:

determining a path name of said source location from a class path vector; and searching a directory at said source location using said path name.

4. The method of claim 1, wherein said steps of searching for said plug-in component and loading said plug-in component are implemented within at least one method of an instance of a factory class, said at least one method being invoked by said application.

5. A computer program product comprising:

a computer usable medium having computer readable program code embodied therein for providing a plug-in component, said computer program product comprising:

computer readable program code configured to initiate a data acquisition request for data, said data acquisition request initiated by an application;

computer readable program code configured to cause a computer to download said data from a source location on a network to be processed by said application;

computer readable program code configured to cause a computer to determine a data type of said data;

computer readable program code configured to cause a computer to determine a plug-in component associated with said data type by extracting header information from said data;

computer readable program code configured to cause a computer to search for said plug-in component; and computer readable program code configured to cause a computer load said plug-in component into transient memory for use by said application for a transient duration.

6. The computer program product of claim 5, wherein said plug-in component is a codec.

7. The computer program product of claim 5, wherein said computer readable program code configured to cause a computer to determine said data type comprises computer readable program code configured to cause a computer to parse header information associated with said data.

8. The computer program product of claim 5 wherein said computer readable program code configured to cause a computer to determine said plug-in component comprises computer readable program code configured to cause a computer to determine a plug-in component name from said data type.

9. The computer program product of claim 5, wherein said computer readable program code configured to cause a computer to search for said plug-in component further comprises:

computer readable program code configured to cause a computer to determine a path name of said source location from a class path vector; and computer readable program code configured to cause a computer to search a directory at said source location based on said path name.

10. A computer data signal embodied in a carrier wave and representing sequences of instructions which, when executed by a processor, cause said processor to provide plug-in components by performing the steps of:

initiating a data acquisition request for data, said data acquisition request initiated by an application residing at a destination location;

downloading said data from a source location;

determining a data type of said data by extracting header information from said data;

determining a plug-in component associated with said data type;

searching for said plug-in component, said search comprising a search of a persistent storage at said source location;

obtaining said plug-in component;

loading said plug-in component into transient memory at said destination location for use by said application.

11. The computer data signal of claim 10, wherein said plug-in component is a codec.

12. The computer data signal of claim 10, wherein said step of determining said data type comprises the step of parsing header information associated with said data.

13. The computer data signal of claim 10, wherein step of determining said plug-in component comprises the step of determining a plug-in component name from said data type.

14. The computer data signal of claim 10, wherein said step of searching for said plug-in component further comprises:

determining a path name of said source location from a class path vector; and searching a directory at said source location based on said path name.

15. A method of providing a plug-in component comprising:

executing an application on a first computer having transient memory, said application configured to initiate a data acquisition request for data having a data type;

downloading said data from a second computer;

determining said data type of said data by extracting header information from said data;

searching for a plug-in component capable of processing said data type;

obtaining said plug-in component for use by said application;

loading said plug-in component into said transient memory of said first computer for a transient duration.

16. The method of claim 15, wherein said step of searching for said plug-in component comprises the steps of:

determining a path name from a class path vector; and searching a directory for said plug-in component using said path name.

17. The method of claim 15, wherein said steps of searching for said plug-in component and loading said plug-in component are implemented within at least one method of an instance of a factory class, said at least one method being invoked by said application.

18. A method of providing a plug-in decoder comprising:

initiating a data acquisition request for data, said data acquisition request initiated by an application;

downloading said data from a source location on a network, said data to be processed by said application;

determining a data type of said data by extracting header information from said data;

determining a plug-in component associated with said data type;

searching for said plug-in component;

obtaining said plug-in component; and loading said plug-in component into said application.

19. The method of claim 18, wherein said step of determining said plug-in component comprises the step of determining a decoder class name from said data type.

20. The method of claim 18, wherein said step of searching for said plug-in component comprises the steps of:

determining a path name of said source location from a class path vector; and searching a directory at said source location using said path name.

21. The method of claim 18, wherein said steps of searching for said plug-in component and loading said plug-in component are implemented within at least one method of an instance of a factory class, said at least one method being invoked by said application.

22. A computer program product comprising:

a computer usable medium having computer readable program code embodied therein for providing a plug-in component, said computer program product comprising:

computer readable program code configured to initiate a data acquisition request for data, said data acquisition request initiated by an application;

computer readable program code configured to cause a computer to download said data from a source location on a network to be processed by said application;

computer readable program code configured to cause a computer to determine a data type of said data;

computer readable program code configured to cause a computer to determine a plug-in component associated with said data type by extracting header information from said data;

computer readable program code configured to cause a computer to search for said plug-in component; and computer readable program code configured to cause a computer load said plug-in component into said application.

23. The computer program product of claim 22, wherein said plug-in component is a codec.

24. The computer program product of claim 22, wherein said computer readable program code configured to cause a computer to determine said data type comprises computer readable program code configured to cause a computer to parse header information associated with said data.

25. The computer program product of claim 22, wherein said computer readable program code configured to cause a computer to determine said plug-in component comprises computer readable program code configured to cause a computer to determine a plug-in component name from said data type.

26. The computer program product of claim 22, wherein said computer readable program code configured to cause a computer to search for said plug-in component further comprises:

computer readable program code configured to cause a computer to determine a path name of said source location from a class path vector; and computer readable program code configured to cause a computer to search a directory at said source location based on said path name.

27. The computer program product of claim 22, wherein said computer readable program code configured to cause a computer to determine said data type comprises computer readable program code configured to cause a computer to parse header information associated with said data.

* * * * *